US011583713B2

(12) United States Patent
Hofmann et al.

(10) Patent No.: US 11,583,713 B2
(45) Date of Patent: Feb. 21, 2023

(54) FIRE-EXTINGUISHING FACILITY, FIRE-EXTINGUISHING SYSTEM COMPRISING SAME, AND METHOD FOR DETERMINING THE EXTENT OF A FIRE

(71) Applicant: MINIMAX GMBH, Bad Oldesloe (DE)

(72) Inventors: Klaus Hofmann, Bad Oldesloe (DE); Joachim Böke, Düsseldorf (DE)

(73) Assignee: Minimax GmbH, Bad Oldesloe (DE)

( * ) Notice: Subject to any disclaimer, the term of this patent is extended or adjusted under 35 U.S.C. 154(b) by 593 days.

(21) Appl. No.: 16/603,176

(22) PCT Filed: Apr. 18, 2018

(86) PCT No.: PCT/EP2018/059863
§ 371 (c)(1),
(2) Date: Oct. 4, 2019

(87) PCT Pub. No.: WO2018/192953
PCT Pub. Date: Oct. 25, 2018

(65) Prior Publication Data
US 2020/0188714 A1    Jun. 18, 2020

(30) Foreign Application Priority Data
Apr. 18, 2017 (DE) .................... 102017108233.6

(51) Int. Cl.
*A62C 35/68* (2006.01)
*A62C 35/60* (2006.01)
(Continued)

(52) U.S. Cl.
CPC ............ *A62C 35/68* (2013.01); *A62C 35/605* (2013.01); *G01F 1/075* (2013.01); *G01F 1/28* (2013.01);
(Continued)

(58) Field of Classification Search
USPC ........................................................ 702/45
See application file for complete search history.

(56) References Cited

U.S. PATENT DOCUMENTS

| 5,297,635 A | 3/1994 | McHugh |
| 6,940,409 B1 | 9/2005 | Green |

(Continued)

FOREIGN PATENT DOCUMENTS

| DE | 10 2011 011 496 | 8/2012 |
| GB | 2243080 | 10/1991 |

(Continued)

OTHER PUBLICATIONS

International Searching Authority, International Search Report in German & English translation in International Appln. No. PCT/EP2018/059863, Jun. 26, 2018, 5 pages.

*Primary Examiner* — Paul D Lee
(74) *Attorney, Agent, or Firm* — Perkins Coie LLP (57) ABSTRACT

The invention relates to a fire-extinguishing facility comprising an extinguishing fluid line for transporting an extinguishing fluid, a plurality of sprinklers connected to the extinguishing fluid line in a fluid-guiding manner which are closed in a standby state and open in an extinguishing state in order to supply the extinguishing fluid, and a flow-measuring device associated with the extinguishing fluid line.

According to the invention, the flow-measuring device is designed to approximately detect a volume flow of the extinguishing fluid transported in the extinguishing fluid line, and an evaluation unit is provided and designed to assign a number of open sprinklers to the approximately detected volume flow.

20 Claims, 8 Drawing Sheets

(51) Int. Cl.
*G01F 1/075* (2006.01)
*G01F 1/28* (2006.01)
*G01F 1/34* (2006.01)
*G01F 1/667* (2022.01)
*G01F 1/68* (2006.01)
*G01F 15/063* (2022.01)

(52) U.S. Cl.
CPC .............. *G01F 1/34* (2013.01); *G01F 1/667* (2013.01); *G01F 1/68* (2013.01); *G01F 15/063* (2013.01)

(56) References Cited

U.S. PATENT DOCUMENTS

| | | | |
|---|---|---|---|
| 7,857,069 B2 | 12/2010 | Yu | |
| 8,068,026 B1 * | 11/2011 | Delerno | A62C 37/50 169/67 |
| 8,749,393 B1 | 6/2014 | Tollefson | |
| 9,776,028 B2 | 10/2017 | Feenstra et al. | |
| 2005/0183868 A1 * | 8/2005 | Taylor | A62C 37/44 169/5 |
| 2005/0273279 A1 * | 12/2005 | Faltesek | A62C 99/009 702/51 |
| 2006/0021760 A1 * | 2/2006 | Golinveaux | A62C 37/50 169/17 |
| 2006/0102735 A1 * | 5/2006 | Heskestad | A62C 37/50 239/69 |
| 2006/0248961 A1 | 11/2006 | Shachar et al. | |
| 2007/0246230 A1 * | 10/2007 | Roberts | A62C 5/02 169/14 |
| 2017/0216641 A1 | 8/2017 | Magnone et al. | |

FOREIGN PATENT DOCUMENTS

| | | |
|---|---|---|
| GB | 2280368 | 2/1995 |
| GB | 2519643 | 4/2015 |
| WO | WO 2014/147418 | 9/2014 |

* cited by examiner

FIRE-EXTINGUISHING FACILITY, FIRE-EXTINGUISHING SYSTEM COMPRISING SAME, AND METHOD FOR DETERMINING THE EXTENT OF A FIRE

PRIORITY CLAIM AND INCORPORATION BY REFERENCE

This application is a 35 U.S.C. § 371 application of International Application No. PCT/EP2018/059863, filed Apr. 18, 2018, which claims the benefit of German Application No. 10 2017 108 233.6, filed Apr. 18, 2017, each of which is incorporated by reference in its entirety.

TECHNICAL FIELD

The present invention relates to a fire-extinguishing facility comprising at least one extinguishing fluid line for transporting an extinguishing fluid, a plurality of sprinklers connected to the extinguishing fluid line in a fluid-guiding manner which are closed in a standby state and open in an extinguishing state in order to supply the extinguishing fluid, and a flow-measuring device associated with the extinguishing fluid line.

In a further aspect, the invention relates to a fire-extinguishing system comprising a fire-extinguishing facility of this kind. In yet a further aspect, the invention relates to a method for determining the propagation of a fire in the case of a property or area protected by a fire-extinguishing facility.

BACKGROUND AND SUMMARY OF THE INVENTION

Fire-extinguishing facilities are generally known in the art. Fire-extinguishing facilities provided with sprinklers, also referred to as sprinkler systems, are typically actuated in the event of a fire, in that an activating element which is arranged on the sprinkler triggers a sprinkler which is closed in the standby state when a predetermined temperature is exceeded or when other fire parameters are detected. The extinguishing fluid is typically water, sometimes with additives such as foaming, corrosion-inhibiting agents or antifreeze, for example. The sprinkler which is thereby changed from standby state into extinguishing state has extinguishing fluid flowing through it, said extinguishing fluid being delivered by means of the sprinkler in the direction of the protected area or the protected property. In order to make it easier for emergency fire-fighting personnel to localize the fire in a relatively large building, for example, with fire-extinguishing facilities known in the art it is possible for the emergency personnel to trace the zones in which extinguishing fluid is flowing, i.e. the zones in which one or multiple sprinklers have been activated. This usually happens by means of specific alarm signals which are activated substantially simultaneously with or following activation (sometimes with a defined time lag) of one or multiple sprinklers and indicate the zone in which the activated sprinkler is located.

Flow detectors for raising the alarm are known in the art, said flow detectors releasing an alarm signal of this kind when a fluid flow above a predetermined threshold value is detected.

However, the alarm means known in the art do not allow the emergency personnel to estimate how great the propagation of the fire in the protected property already is when the emergency personnel arrive, but only the (rough) position. If the alarm means are each associated with particular zones, for example, their actuation only indicates the zone concerned.

Against this background, there was a need to develop a fire-extinguishing facility of the kind referred to above so that a more accurate determination of the fire size or the propagation of the fire can be achieved with the simplest possible means. The problem addressed by the invention was therefore that of providing a fire-extinguishing facility which overcomes the disadvantages described above insofar as possible.

The invention solves the problem on which it is based with a fire-extinguishing facility of the kind referred to above, in that the flow-measuring device is designed to approximately detect a volume flow of the extinguishing fluid transported in the extinguishing fluid line, in that an evaluation unit is provided which is designed to assign a number of open sprinklers to the approximately detected volume flow. The term extinguishing fluid line is understood to mean according to the invention a main line or a secondary distributor line of the fire-extinguishing facility, wherein the main line is the line in which the valve station for connecting the fire-extinguishing facility to the extinguishing fluid supply is typically arranged and the secondary distributor line is a line which branches off from the main line and from which the lines in which the sprinklers are arranged branch off in turn.

The invention is based on the knowledge that in order to assess the propagation of the fire, it is not necessary to know exactly how much extinguishing fluid per unit of time is being transported through the extinguishing fluid line of the fire-extinguishing facility. The only crucial thing, however, is to be able to determine how many sprinklers are active, as the greater the propagation of a fire, the more sprinklers it activates. Due to its design, a sprinkler always transports extinguishing fluid with roughly the same volume flow under the same operating prerequisites. A fire-extinguishing facility which is designed for a particular operating pressure will therefore always deliver extinguishing fluid in roughly the same volume flow per sprinkler at this operating pressure. This means that the volume flow transported by the extinguishing fluid line always increases by a given amount or a given magnitude when a sprinkler is activated. The invention is formulated here, in that it proposes that the extinguishing fluid flow through the extinguishing fluid line should only be approximately quantitatively determined. An increase in the extinguishing fluid volume flow may, for example, be caused by a fluctuation in the extinguishing fluid pressure on the supply side or, on the other hand, by an opening of one or more additional sprinklers. The supply-side fluctuation of the extinguishing fluid pressure is usually smaller by orders of magnitude than the change in the extinguishing fluid volume flow when an additional sprinkler is opened. The evaluation unit according to the invention is therefore designed to determine whether a detected change in volume flow corresponds in terms of magnitude to the opening of one or multiple sprinklers. Likewise, the statement as to whether one, two or more sprinklers are open enables the emergency personnel attending to draw direct conclusions as to the propagation of the fire in the protected property.

In preferred embodiments of the invention, the evaluation unit is either structurally integrated in the flow-measuring device or configured as a separate component. As a separate component, the evaluation unit is preferably arranged in or on a fire-extinguishing facility control unit or on the outside of the fire-extinguishing facility. In the latter case, the evaluation unit is incorporated in a fire-extinguishing system which comprises the fire-extinguishing facility and is preferably arranged in a central fire alarm system and/or a central fire-extinguishing system.

In a preferred development of the invention, the flow-measuring device comprises a rotor element and is designed to detect the speed of the rotor element driven by the extinguishing fluid. The rotor element has multiple paddles, for example, or is configured as a turbine wheel.

In a further preferred embodiment, the flow-measuring device has a pressure sensor for detecting a dynamic pressure in the extinguishing fluid line or multiple pressure sensors at different points along the extinguishing fluid line for detecting pressure differences between the points.

In a further preferred embodiment, the flow-measuring device has a thermo-anemometry sensor and is designed to detect temperature changes in a heating element of the thermo-anemometry sensor, which heating element has extinguishing fluid flowing round it.

In a further preferred embodiment, the flow-measuring device comprises an ultrasound flow meter and is designed to detect the speed of at least one partial flow of the extinguishing fluid by means of the transmission and receiving of acoustic waves.

In a further preferred embodiment, the flow-measuring device has a flow resistance element in the form of a paddle or similar, for example, which is designed to have extinguishing fluid flowing around it and, as a result of the circulation, to be deflected in a translational and/or rotational manner, wherein the flow-measuring device is designed to detect the deflection of the flow resistance element in qualitative or quantitative terms, in particular by detecting the force acting on the flow resistance element or by detecting the deflection amount.

In a further preferred embodiment, the flow-measuring device comprises a voltage measuring sensor and is designed to measure a generator-induced voltage, wherein the generator is driven by a rotor element which has extinguishing fluid flowing around it.

The preferred embodiments described above represent different tried-and-tested measuring methods for flow detection which are well known in other operational environments. In preferred embodiments of the invention, one, several, or all the flow-measuring devices are combined with one another.

In a preferred embodiment of the invention, the association between the approximately detected volume flow and the number of open sprinklers depends on one, several, or all of the following parameters:

a predetermined relationship between the actual volume flow of the extinguishing fluid and the volume flow detected by the flow-measuring device, the K-factor(s) of the sprinklers in each case, and/or the extinguishing fluid pressure in the extinguishing fluid line.

The evaluation unit can preferably be programmed by means of a corresponding data interface with these parameters.

The predetermined relationship between the actual volume flow of the extinguishing fluid and the volume flow detected by the flow-measuring device is preferably established in preliminary tests and preferably exists in the form of a characteristic curve. It indicates to what extent with a particular detected measurement the actual volume flow in the extinguishing fluid line is approximate. The relationship depends on the installation site of the flow-measuring device, the flow conditions at the installation site and the measuring principle used. A mean characteristic curve is typically created in a series of preliminary tests.

The K-factor is a coefficient for the sprinkler flow, design-based and known for each sprinkler type, cf. EN 12259-1, for example.

The flow through the sprinkler results according to EN 12845:2015+AC:2016, for example, from the equation $$Q = K\sqrt{p}, \text{ where}$$

Q is the flow in l/min,
p is the pressure in bar, and
K is the flow coefficient for the sprinkler.

Each combination of pressure and K-factor produces a standard minimum flow for the sprinkler. When activated, the volume flow in the extinguishing fluid line increases by this value. This flow value typically lies above 40 l/min, so that detection of a flow value which roughly corresponds to a whole-number multiple of this sprinkler-dependent Q-value allows a simple association with the number of open sprinklers.

By means of the parameters defined above, the evaluation unit is capable of determining by way of algorithm whether the approximately detected volume flow is associated with one or more activated sprinklers or whether a detected volume flow change is too small to allow the inference to be drawn that an additional sprinkler has been activated.

In a further preferred embodiment of the invention, the evaluation unit is designed to log the course of the approximate detection of the volume flow transported in the extinguishing fluid line over time, and preferably to deposit it in a readable data record. The evaluation unit has the processor and data storage means necessary for this which are generally known to the person skilled in the art in each case.

In a further preferred embodiment in which the flow-measuring device has a rotor element, the rotor element of the flow-measuring device is coupled with a generator for producing electrical energy.

In a further preferred embodiment, the flow-measuring device has means for wireless or wired data transmission and is designed to transmit the values of the approximately detected volume flow to the evaluation unit. The means for data transmission preferably include a transmitting and/or receiving device for unidirectional or bidirectional data transmission, for example a WiFi module. In particular, the embodiment of a flow-measuring device capable of receiving allows the installation of calibration data and software or firmware updates, particularly preferably by remote data transfer.

Particularly when combining the two aforementioned aspects, in other words the coupling of the rotor element with a generator for producing electrical energy and a flow-measuring device with data transfer means, the fire-extinguishing facility and, in particular, the flow-measuring device, more preferably comprises an energy store for the electrical energy produced by the generator, wherein the energy store is connected to means for data transfer for the energy supply thereof. This allows the infrastructure of the fire-extinguishing facility to be simplified, since the means for data transfer in the event that the fire-extinguishing facility and the sprinklers thereof are in standby state, need not necessarily be supplied with outside electrical energy. In the majority of fire-extinguishing facilities that are in use, it is an absolute exception for the fire-extinguishing facility actually to have to become active. The fact that for long periods of time, sometimes many years, the fire-extinguishing facility leaves the standby state only for routine functional tests means that through the self-sufficient energy supply to the data transfer means, a significant financial saving is potentially possible.

In a particularly preferred embodiment, the fire-extinguishing facility according to the invention has a display unit which communicates with the evaluation unit and is designed to indicate the number of open sprinklers associated with the detected volume flow. The display unit is preferably arranged at a location generally accessible for emergency personnel, right at/in the property or area being monitored, and/or outside the fire-extinguishing utility. In the latter case, the one or multiple display units is/are preferably incorporated in a fire-extinguishing system and configured as mobile units and/or arranged in or on a central fire alarm system and/or a central fire-extinguishing system.

In preferred embodiments, the display unit is connected or connectable to the evaluation unit either for wired signal transmission or for wireless signal transmission.

The flow-measuring device is preferably designed to start automatically with transmission of the approximately detected volume flows, as soon as an extinguishing fluid flow which exceeds a predetermined threshold value is detected. The flow-measuring device is preferably designed to start transmission after a predefined delay time has elapsed.

In a further preferred embodiment of the fire-extinguishing facility which includes a flow-measuring device with rotor element, the rotor element of the flow-measuring device is arranged peripherally in the extinguishing fluid line. This should be understood to mean that the rotor element is arranged in the immediate vicinity of the wall of the pipeline and does not extend into the middle of the extinguishing fluid line. It is thereby achieved that the volume flow can pass largely unimpeded through the extinguishing fluid line. The flow resistance caused by the flow-measuring device is thereby minimized. The approximate detection of the volume flow can, however, continue unabated. The flow-measuring device preferably has a screen for protecting the rotor element from contamination.

The rotor element preferably has a rotor diameter and extends within the extinguishing fluid line with less than the rotor diameter, in particular with less than half the rotor diameter. This is particularly advantageous to rotor elements in which the rotor axis is oriented tangentially or tangentially parallel to the wall of the extinguishing fluid line and runs perpendicularly to the longitudinal axis of the extinguishing fluid line.

Particularly preferably, the flow-measuring device has a screening element which is arranged upstream adjacent to the rotor element in the extinguishing fluid line and surrounds the rotor element in such a manner that the rotor element is partially screened from the flow in the extinguishing fluid line. If, for example, one of two sides of the rotor element is screened, the direction of rotation is prescribed for the rotor element, insofar as the same flow exists on both sides of the rotor element. Consequently, the screening element also makes it easier for the rotor element to rotate, as the flow is conducted on only one side of the rotor axis, while the second side remains screened, as viewed from the rotor side.

In an alternative preferred embodiment, the flow-measuring device is arranged in a bypass line which branches from the extinguishing fluid line. The arrangement of the flow-measuring device in the bypass line capitalizes on the knowledge that it is sufficient for only a partial flow of the total extinguishing fluid flowing through the fire-extinguishing facility to be observed in measurement terms, because by comparing the volume flow detected by the flow-measuring device with a predefined operating characteristic curve based on a structurally unchanged design, it is possible to estimate approximately how high the volume flow in the extinguishing fluid line is when there is a given measured volume flow in the bypass line.

In preferred embodiments, the bypass line has, preferably on the inlet side, a screen and/or a filter to protect the bypass line and the flow-measuring device arranged therein from contamination.

In a first preferred embodiment of the bypass line, said bypass line branches off from the extinguishing fluid line at a first branch and opens back into the extinguishing fluid line downstream at a second branch.

In an alternative preferred embodiment, the bypass line branches from the extinguishing fluid line at a common branch, viewed in the flow direction of the extinguishing fluid, and opens back into the extinguishing line at the common branch. This may be implemented in structural terms in that, for example, the bypass line has a branch line which is guided within an opening branch line and runs in a line loop before it is finally introduced laterally into the opening branch line. The opening branch line may be fitted onto the extinguishing fluid line with a single T-piece and the branch line extends through the opening branch line into the extinguishing fluid line. This embodiment is advantageous both with regard to the fittings required and also in relation to the installation space needed.

The invention is described above with reference to the fire-extinguishing facility itself. In a further aspect, however, the invention also relates to a fire-extinguishing system which includes the fire-extinguishing facility according to the invention as a system component.

The fire-extinguishing system according to the invention which makes full use of the advantages and preferred embodiments of the fire-extinguishing facility described above is advantageously developed in that it comprises one or more, preferably mobile, display units which communicate with the flow-measuring device and/or the evaluation unit and are designed to display the number of open sprinklers associated with the volume flow detected. The mobile units are preferably portable hand units, for example tablets or smart phones, and are operated using an app programmed in conjunction with the flow-measuring device of the fire-extinguishing facility which displays the number of open sprinklers detected and assigned by the flow-measuring device in each case, either at fixed updating time intervals or as a consequence of manual updating, and also preferably the zone in which the sprinkler or sprinklers is/are open if the fire-extinguishing facility is a multi-zonal fire-extinguishing facility, The method according to the invention is advantageously developed in that the approximate detection of the volume flow involves one, several, or all of the following steps:

detection of the speed of a rotor element driven by the extinguishing fluid;

detection of pressure differences at different points along the extinguishing fluid line;

detection of temperature changes in a heating element with the extinguishing fluid flowing round it;

detection of the speed of at least a partial flow of the extinguishing fluid by means of the transmission and reception of acoustic waves;

qualitative or quantitative detection of the deflection of a flow resistance element, in particular by detection of the force acting on the flow resistance medium or by detection of the deflection amount of the flow resistance element which has extinguishing fluid flowing round it and the circulating flow is therefore deflected; and/or detection of the voltage produced by a generator driven by means of the rotor element.

The method is preferably further developed in that the approximate detection of the volume flow further comprises:

creation or supply of a characteristic curve which defines the correlation between the volume flow detected by the flow-detection device and the actual volume flow in the extinguishing fluid line of the fire-extinguishing facility.

The creation or provision of the characteristic curve is preferably repeated at predetermined time intervals, for example every five to ten years. In this way, a time-based deterioration of the free flow cross section in the fire-extinguishing facility due to corrosion, for example, can be taken into account. The current state of the extinguishing fluid line in each case can be examined, for example, in that extinguishing fluid is removed from the main distributor line or from a secondary distributor line by means of a discharge valve, in order to simulate the opening of one or more sprinklers. By means of a volume flow value thereby determined, it is possible to estimate whether, and to what extent, contamination within the extinguishing fluid line causing a reduction is pronounced and, where necessary, a new characteristic curve for the flow-measuring device can be determined in renewed testing.

The method preferably also comprises the step:

logging the course of the approximate detection of the volume flow conveyed in the extinguishing fluid line over time and preferably recording the log in a readable data file record.

In addition, the method preferably comprises the step: Wireless or wired data transmission of the values of the approximately detected volume flow and/or of the data record with the logged course of the approximate detection of the volume flow conveyed in the extinguishing fluid line to an evaluation unit and/or one or more display units, and/or other receiving units, preferably by means of wireless or wired data transmission.

The method preferably also comprises: energy supply to the means for data transmission by means of a generator driven by a rotor element of the flow-measuring device.

The method is further preferably developed by the step: displaying the number of open sprinklers associated with the detected volume flow on a display unit which communicates with the flow-measuring device.

BRIEF DESCRIPTION OF THE DRAWINGS

The invention is described below with reference to the attached figures with the help of a plurality of preferred exemplary embodiments.

MODE(S) FOR CARRYING OUT THE INVENTION

Figure 1:
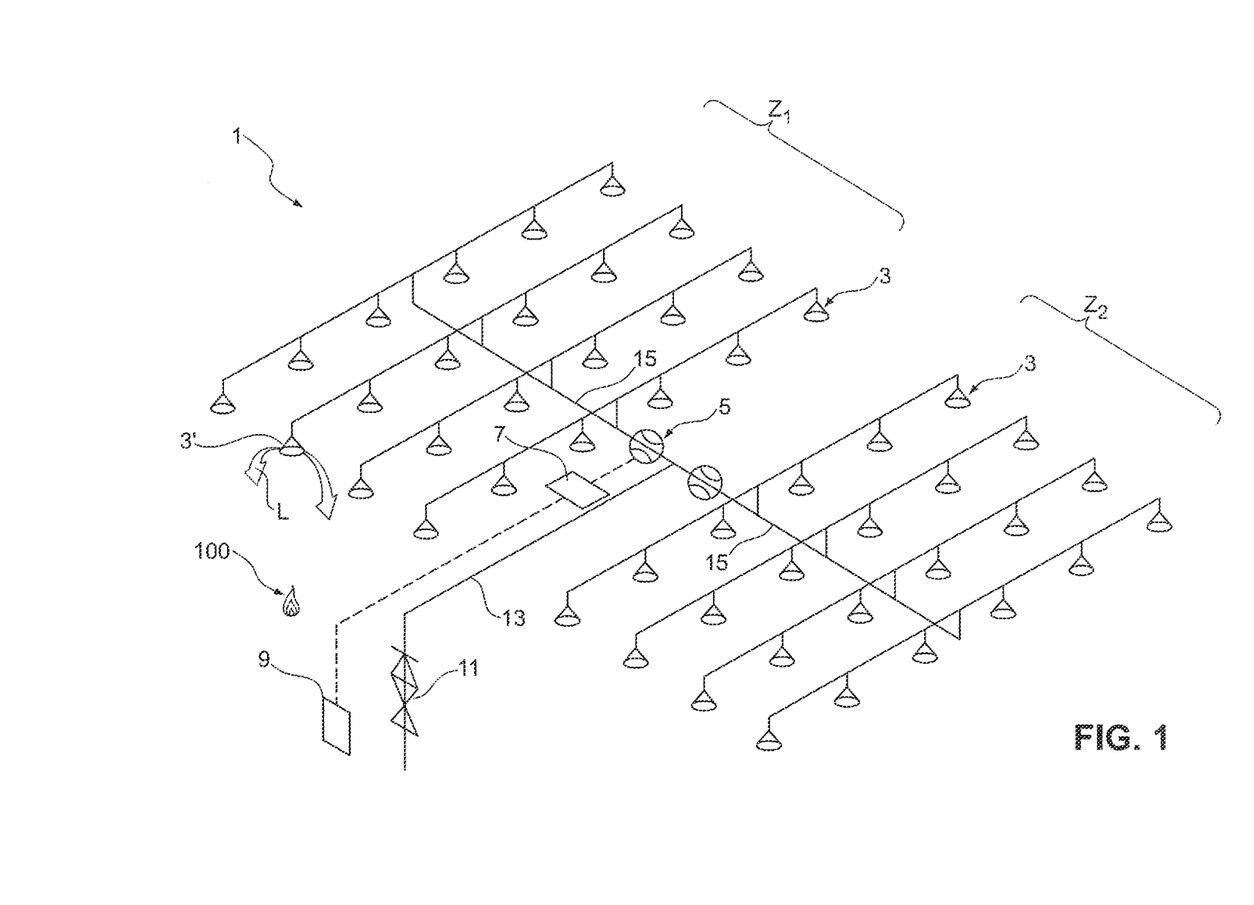
FIG. 1 shows a schematic representation of a fire-extinguishing system according to a preferred exemplary embodiment of the invention.

The fire-extinguishing facility 1 depicted in FIG. 1 comprises an extinguishing fluid line with a main line 13 which is connected to a valve station 11. The valve station 11 creates the fluid-conducting connection between the extinguishing fluid supply (not shown) and the pipeline network of the fire-extinguishing facility 1. Starting from the main line 13, the extinguishing fluid line is divided into two or more secondary distributor lines 15, a first of which leads into a first zone $Z_1$ and a second into a second zone $Z_2$. The secondary distributor lines 15 are further used within their respective zones as an extinguishing fluid line for the lines with sprinklers 3 departing from them in the manner of a network. Multiple sprinklers 3 are arranged in the two zones $Z_{1,2}$. If one of the sprinklers, for example through the triggering of a thermal activation element, is moved from its standby state into the extinguishing state, as with the sprinkler 3' depicted by way of example, extinguishing fluid L flows from the sprinkler towards a fire 100. The extinguishing fluid flow which feeds the activated sprinkler(s) 3' is supplied by the valve station 11.

The fire-extinguishing facility 1 also has a flow-measuring device 5 which is designed for the approximate detection of the volume flow which moves through the extinguishing fluid line 13,15 and for mapping the number of sprinklers 3' activated in the fire-extinguishing facility 1 depending on the volume flow detected. As indicated in FIG. 1, one or multiple flow-measuring devices are provided for each zone, in order to make the localization of the fire easier for any emergency personnel. The flow-measuring device 5 is connected to an electronic evaluation unit 7 in a signal-conducting manner, wherein the electronic evaluation unit 7 performs the evaluation function of the measured values determined by the flow-measuring device 5. Both components may, however, also be integrated in a unit.

The flow-measuring device 5 is, in addition, connected in a signal-conducting manner (either directly or indirectly via the evaluation unit 7) to a display unit 9 which may be arranged as a stationary display, for example at access points to the property protected by the fire-extinguishing facility 1 or in a central fire alarm system and/or central fire-extinguishing systems. Alternatively or in addition, one or multiple mobile display units may be provided which are in the form of tablets or smart phones, for example, and run an app which is programed to display the assignment number of open sprinklers determined by the flow-measuring device 5 with the help of the evaluation unit 7. The app is preferably programed to display the number and arrangement of the open sprinklers in a graphic representation, for example by means of indicators of the zone of the protected property or area in a site plan.

The flow-measuring device 5 is only schematically depicted in FIG. 1. Different preferred exemplary embodiments for the flow-measuring device 5 are depicted in FIGS. 3 to 8.

Figure 2:
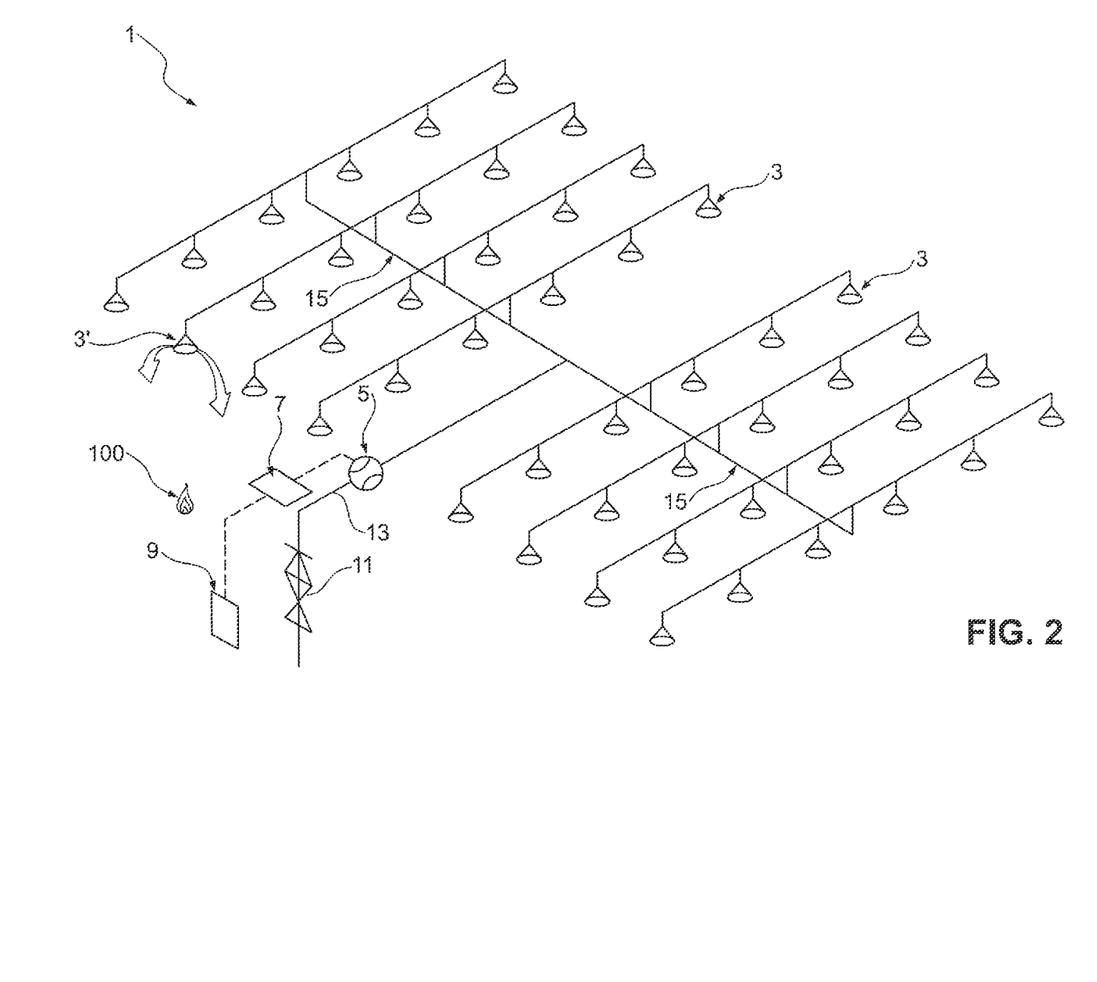
FIG. 2 shows a variant of the fire-extinguishing system according to FIG. 1.

The fire-extinguishing facility 1 in FIG. 2 substantially corresponds to the one in FIG. 1, which is why the same reference numbers are used for identical or functionally identical elements. Reference is made to the comments on the other figures in relation to those elements. The fire-extinguishing facility 1 shown in FIG. 2 differs from FIG. 1 in that only one flow-measuring device 5 is provided and directly assigned to the main line 13 instead of the secondary distributor line 15.

Figure 3:
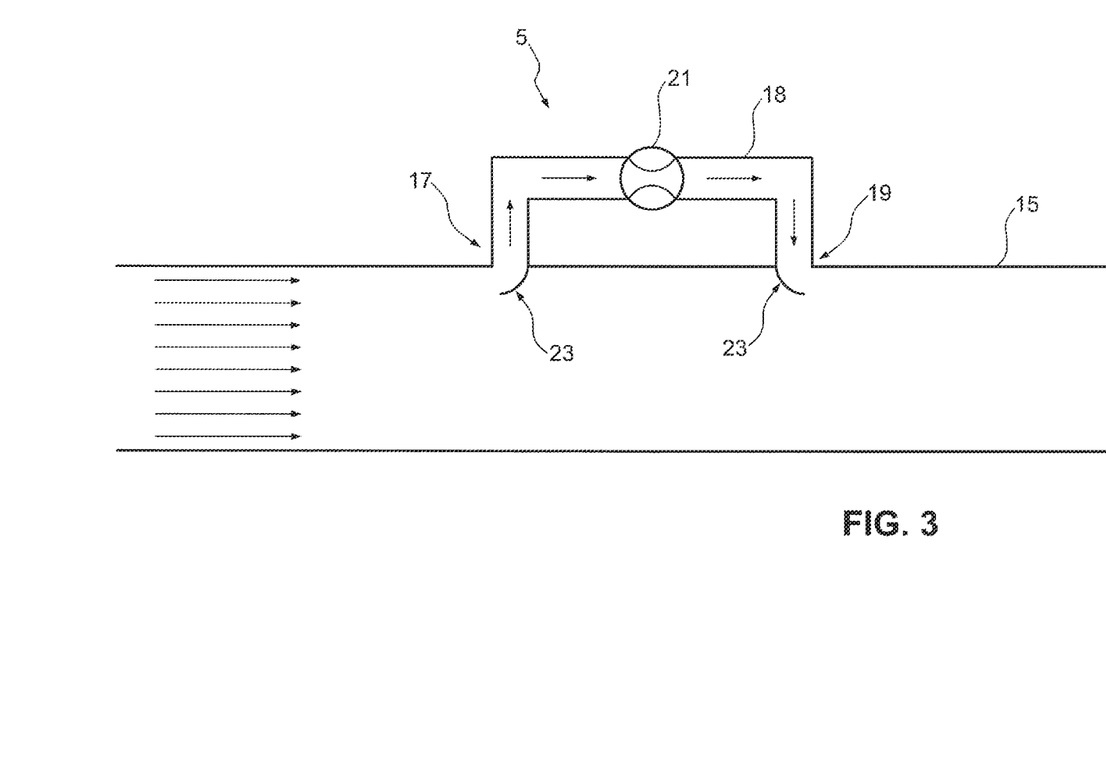
FIG. 3 shows a first variant of the flow-measuring device for the fire-extinguishing facility according to FIG. 1 or 2.

FIG. 3 initially shows a flow-measuring device 5 which comprises a sensor 21 according to a preferred embodiment generally described above which is arranged in a bypass line 18. The bypass line 18 branches from the extinguishing fluid line 15 at a first point 17 (first branch) and opens back into the extinguishing fluid line 15 at second point 19 (second branch) arranged downstream of the first point 17.

In order to support the flow discharge or flow return from/into the extinguishing fluid line 13, 15, flow-conducting elements 23 are arranged at each of the branches 17, 19, configured as guide plates for example. The flow diverted from the extinguishing fluid line 13, 15 represents only a partial flow of the total volume flow in the extinguishing fluid line 13, 15. The flow speed in the vicinity of the wall of the extinguishing fluid line 13, 15 is smaller in practice than in the middle of the extinguishing fluid line 13, 15. Within the framework of preliminary tests, a characteristic curve is therefore preferably determined which defines the correlation between the volume flows measured in the bypass line 18 and the volume flow actually flowing in the extinguishing fluid line 5 which may be specified in the preliminary tests. The characteristic curve may also have a non-linear course and ensure in each case that the volume flow in the extinguishing fluid line 13, 15 can be approximately detected with sufficient accuracy, in order to establish an association between the volume flow and the number of open sprinklers.

At the same time, the extinguishing fluid can furthermore flow through the extinguishing fluid line 13, 15 largely unimpeded, as a partial flow is removed only in the periphery of the flow.

Figure 4:
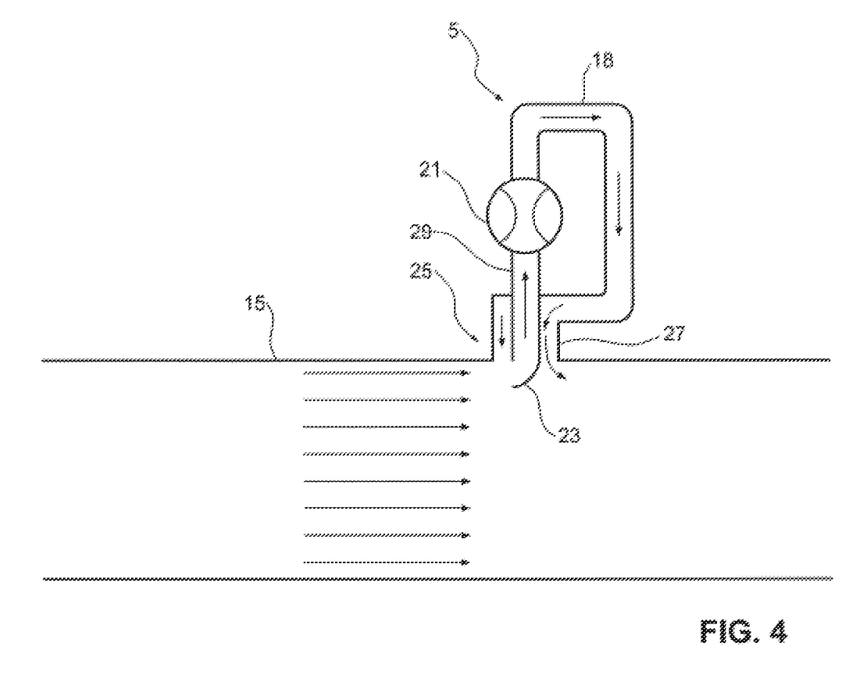
FIG. 4 shows a further variant of a flow-measuring device for the fire-extinguishing facility according to FIG. 1 or FIG. 2.

FIG. 4 shows by comparison with FIG. 3 an alternative embodiment of the bypass line 18. Unlike the embodiment according to FIG. 3, two different branches 17, 19 are not provided, but instead a common branch 25 at which both a discharging branch line 29 and also a returning branch line 27 (opening-out branch line) of the bypass line 18 are connected to the extinguishing fluid line 15. The discharging branch line 29 (branching-off line) is preferably conducted back through the returning branch line 27 (opening-out branch line) and the bypass line 18 loops before it opens out into the returning branch line 27 (opening-out branch line), particularly on the side. The embodiment according to FIG. 4 advantageously combines reduced equipment expenditure and minimized installation space with one another.

Figure 5:
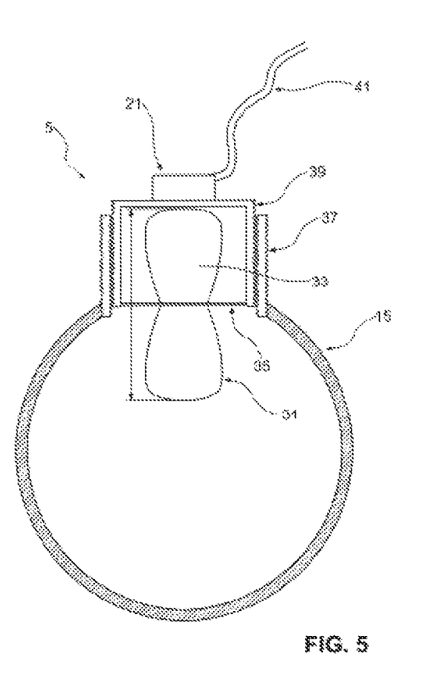
FIG. 5 shows a further variant of a flow-measuring device for the fire-extinguishing facility according to FIG. 1 or 2.

FIG. 5 shows a detail view of a fire-extinguishing facility according to FIG. 1 or 2, in which the flow-measuring device 5 is not arranged in a bypass, as is the case in FIGS. 3 and 4. Instead of this, the flow-measuring device 5 in FIG. 5 is placed directly in the periphery of the extinguishing fluid line 13, 15. The flow-measuring device 5 has a rotor element 31 which comprises multiple rotor blades 33 that are mounted in a manner rotating about the rotary axis 35. The rotor element 31 is preferably inserted by means of an insert 39 into the periphery of the extinguishing fluid line 15, wherein the insert 39 can be screwed into a fitting 37. In this way, the insertion depth and the angular alignment of the rotor element remain adjustable. The fitting 37 is preferably configured as a T-piece or a saddle clamp.

The sensor 21 depicted in FIG. 5 is preferably configured as a Hall effect sensor. One, multiple, or all rotor blades 33 are then preferably configured partially or completely magnetically, in order to respond to the Hall sensor.

The flow-measuring device 5 in FIG. 5 is connected to the display unit 9 shown in FIG. 1 or 2 and/or the evaluation unit 7 by means for data transmission in a signal-conducting manner, indicated here by one or multiple cable lines 41. Alternatively, the flow-measuring device is set up for wireless communication with the display unit(s). In this case, the means for data transmission comprise a transmitting and/or receiving device, preferably with a WiFi module, as shown schematically in the following figures.

Figure 6:
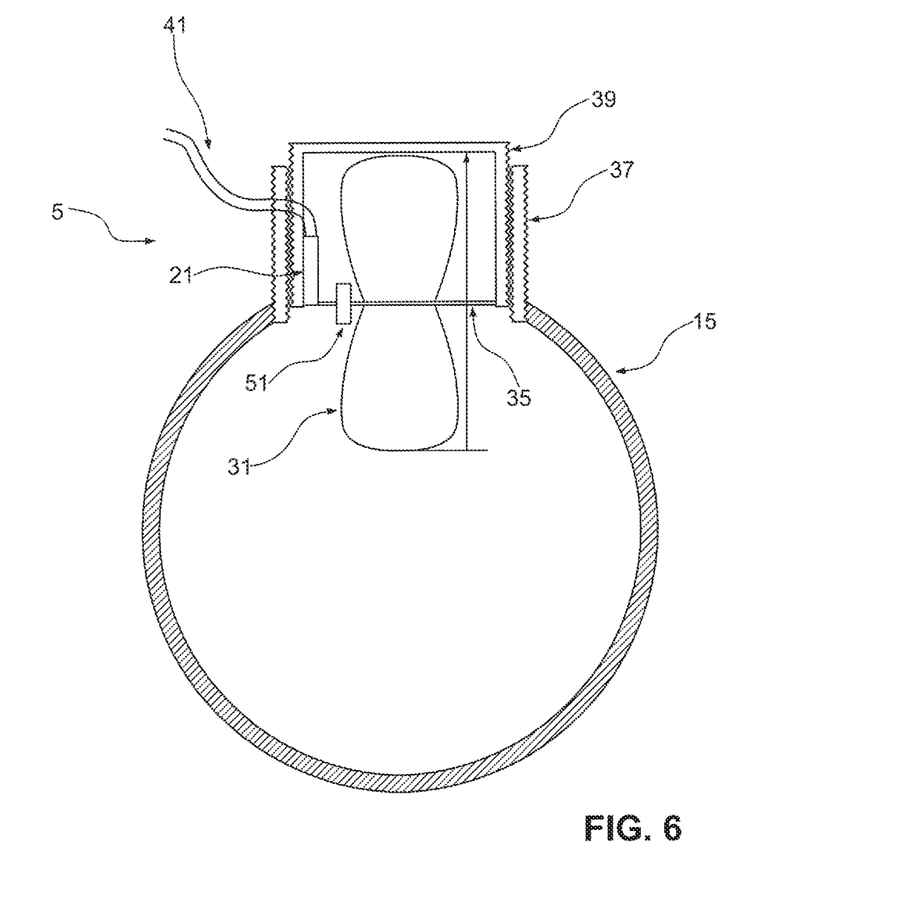
FIG. 6 shows a further variant of a flow-measuring device for the fire-extinguishing facility according to FIG. 1 or 2.

FIG. 6 shows a modification of the measuring arrangement from FIG. 5. The variant of the flow-measuring device 5 depicted in FIG. 6 likewise comprises a sensor 21 configured as a Hall effect sensor for detecting the speed of the rotor element. This sensor 21 is, however, arranged within the housing of the insert 39 and the rotor blades 33 (cf. FIG. 5) are not used to respond to the sensor 21, but instead an exciter element 51 is operatively connected to the rotor element 31 on the rotor axis 35 thereof, the rotation of which is detected by the sensor 21. The exciter element is at least partially designed as a magnet, in particular as a magnetic ring.

In embodiments in which the housing of the insert 39 is not of ferromagnetic design, the sensor 21 could also be arranged, alternatively, outside the insert 39, as has already been shown in FIG. 5, for example.

Figure 7:
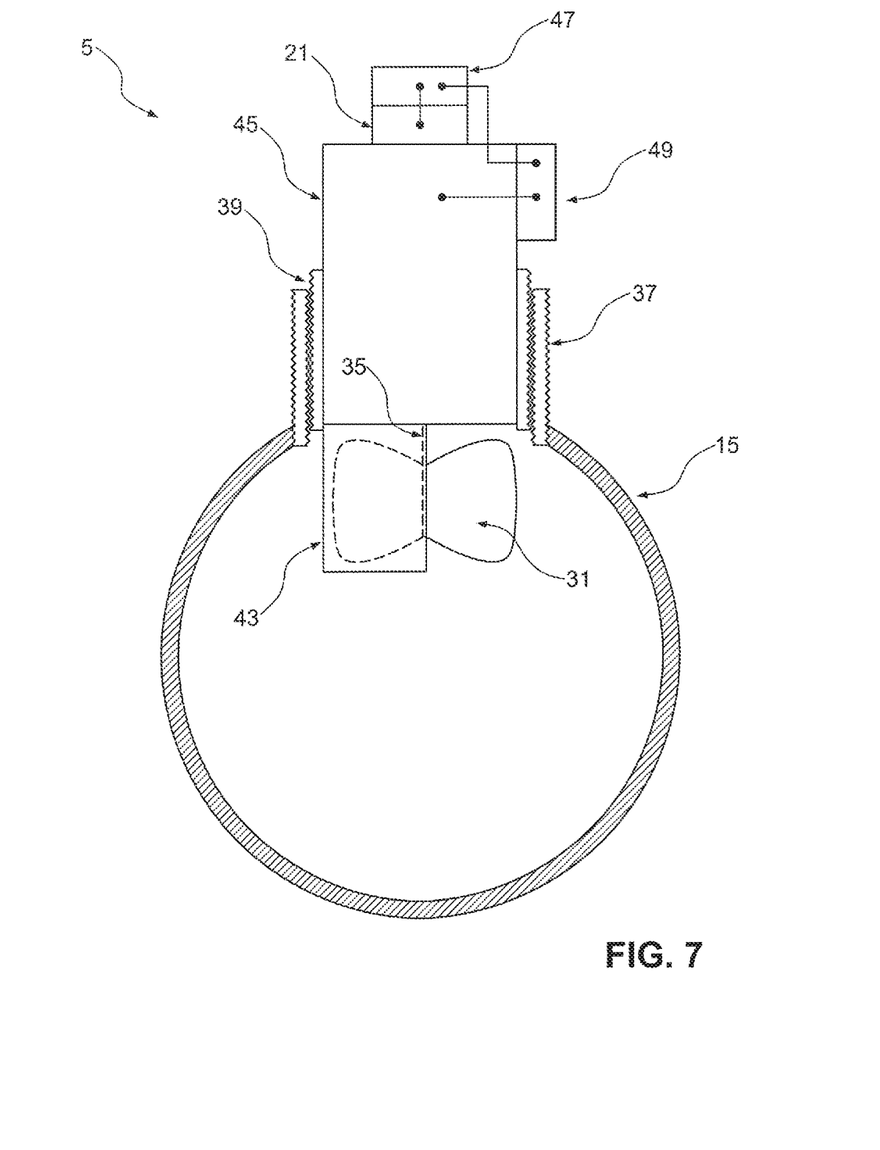
FIG. 7 shows a further variant of a flow-measuring device for the fire-extinguishing facility 1 according to FIG. 1 or 2.

The flow-measuring device for the fire-extinguishing facility 1 according to FIG. 1 or 2 depicted in FIG. 7 is also based on a rotor element 31 which is set in motion as a result of the extinguishing fluid flow. Unlike the embodiments according to FIGS. 5-6, the rotor axis 35 of the rotor element 31 is oriented substantially radially relative to the flow direction in the extinguishing fluid line 15. In order to support the movement of the rotor element 31 and protect it from negative flow effects, the flow-measuring device 5 according to FIG. 7 also has a screening element 43 which partially surrounds the rotor element 33. The flow-measuring device 5 according to FIG. 7 is preferably screwed in. Reference is made to the embodiments in FIGS. 5 and 6 in this respect.

The flow-measuring device 5 according to FIG. 7 has, in addition, a generator 45 which is designed to convert the rotational movement of the rotor element 31 into electrical voltage. The sensor 21 which is built into the flow-measuring device 5 according to FIG. 7 is preferably configured as a voltmeter sensor and taps the voltage produced by the generator. Alternatively, the sensor 21 is configured as a Hall effect sensor, as in FIGS. 5, 6 or in the following FIG. 8, for example, and designed to record the speed of the rotor element 31 and pass it on as a measured variable.

The flow-measuring device 5 according to FIG. 7 comprises a transmitting and/or receiving device 47 as means for data transmission to the evaluation unit 7 (cf. FIG. 1, 2) and/or one or multiple display units 9 (cf. FIGS. 1, 2), and is particularly preferably supplied with electrical energy by means of the voltage produced by the generator 43. It may be preferable for the generator 43, or else the flow-measuring device 5, also to have an energy store 49 for the (temporary) storage of electrical energy which is generated starting from the driving of the rotor element 31. The flow-measuring device 5 preferably has a connection for an external power supply.

Figure 8:
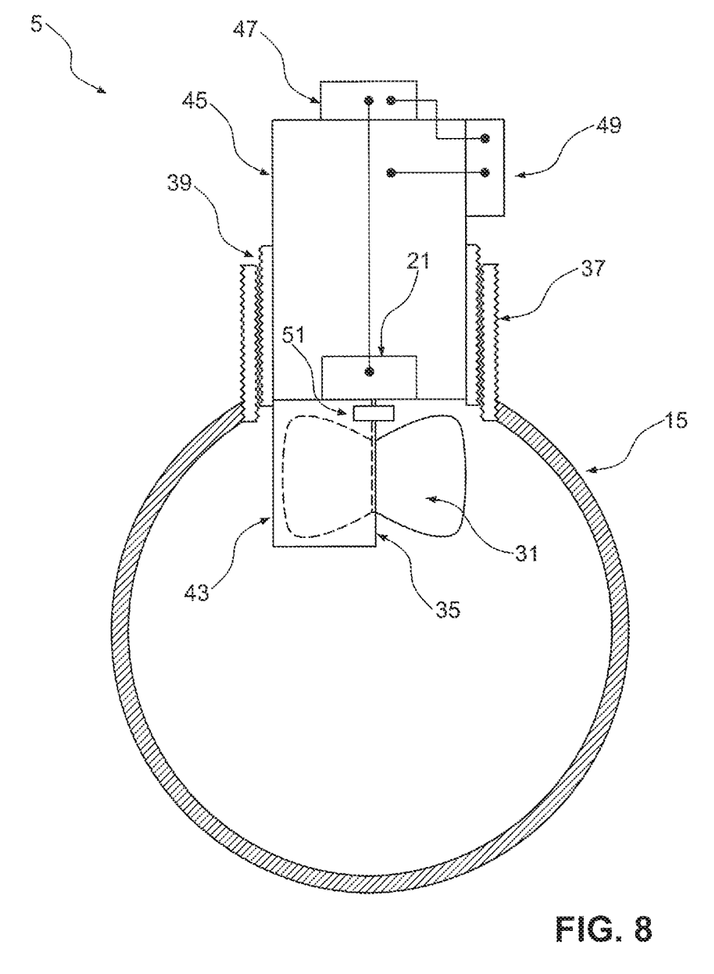
FIG. 8 shows a further variant of a flow-measuring device for the fire-extinguishing facility 1 according to FIG. 1 or 2.

The flow-measuring device 5 according to FIG. 8 differs from the one in FIG. 7 only in that the sensor 21, as in FIGS. 5, 6, is depicted as a Hall effect sensor and is arranged immediately adjacent to the rotor element 31. The rotor element 31 is operatively connected to an exciter element 51 for responding to the sensor 21, wherein the exciter element 51 is at least partially designed as a magnet, for example as a magnetic ring. Otherwise, reference is made to the above comments on FIG. 7 in relation to FIG. 8.

LIST OF REFERENCE NUMBERS

1 Fire-extinguishing facility
3 Sprinkler, standby state
3' Sprinkler, extinguishing state
5 Flow-measuring device
7 Electronic evaluation unit
9 Display unit
11 Valve station
13 Main line, part of the extinguishing fluid line
15 Secondary distributor line, part of the extinguishing fluid line
17 First branch
18 Bypass line
19 Second branch
21 Sensor
23 Flow-conducting element
25 Common branch
27 Opening-out branch line
29 Branching-off line
31 Rotor element
33 Rotor blade
35 Rotor axis
37 Fitting
39 Insert
41 Means for data transmission: signal line
43 Screening element
45 Generator
47 Means for data transmission: Transmitting and/or receiving device (wired, wireless)
49 Energy store
51 Exciter element
100 Fire
L Extinguishing fluid
$Z_1$, $Z_2$ Zones

The invention claimed is:

1. A fire-extinguishing facility comprising:
a fluid supply that provides an extinguishing fluid,
at least one extinguishing fluid line for transporting the extinguishing fluid,
a valve station configured to establish a fluid-conducting connection between the fluid supply and the at least one extinguishing fluid line,
a plurality of sprinklers connected to the at least one extinguishing fluid line in a fluid-guiding manner which are closed in a standby state and open in an extinguishing state in order to supply the extinguishing fluid,
a flow-measuring device associated with the at least one extinguishing fluid line, the flow-measuring device designed to approximately detect a volume flow of the extinguishing fluid transported in the at least one extinguishing fluid line during the fluid-conducting connection between the fluid supply and the at least one extinguishing fluid line, and
an evaluation unit which is designed to assign a number of one or more open sprinklers for the approximately detected volume flow to determine propagation of a fire in the facility.

2. The fire-extinguishing facility as claimed in claim 1, wherein the flow-measuring device comprises a rotor element and is designed to detect the speed of the rotor element driven by the extinguishing fluid.

3. The fire-extinguishing facility as claimed in claim 2, wherein the rotor element of the flow-measuring device is coupled with a generator for producing electrical energy.

4. The fire-extinguishing facility as claimed in claim 3, further comprising an energy store for the electrical energy produced by the generator, wherein the energy store is connected to the transmitting and/or receiving device for the energy supply thereof.

5. The fire-extinguishing facility as claimed in claim 2, wherein the rotor element of the flow-measuring device is arranged peripherally in the extinguishing fluid line.

6. The fire-extinguishing facility as claimed in claim 1, wherein the flow-measuring device has a pressure sensor for detecting a dynamic pressure in the extinguishing fluid line or multiple pressure sensors at different points along the extinguishing fluid line for detecting pressure differences between the points.

7. The fire-extinguishing facility as claimed in claim 1, wherein the flow-measuring device has a thermo-anemometry sensor and is designed to detect temperature changes in a heating element which has extinguishing fluid flowing round it.

8. The fire-extinguishing facility as claimed in claim 1, wherein the flow-measuring device comprises an ultrasound flow meter and is designed to detect the speed of at least one partial flow of the extinguishing fluid by means of the transmission and receiving of acoustic waves.

9. The fire-extinguishing facility as claimed in claim 1, wherein the flow-measuring device has a voltmeter sensor for measuring a voltage induced by a generator, wherein the generator is driven by a rotor element which has extinguishing fluid flowing around it.

10. The fire-extinguishing facility as claimed in claim 1, wherein the flow-measuring device has a flow resistance element in the form of a paddle, which is designed to have extinguishing fluid flowing around it and, as a result of the circulation, to be deflected, and wherein the flow-measuring device is designed to detect the deflection of the flow resistance element in qualitative or quantitative terms by detecting the force acting on the flow resistance element or by detecting the deflection amount.

11. The fire-extinguishing facility as claimed in claim 1, wherein the association between the approximately detected volume flow and the number of open sprinklers depends on one, several, or all of the following parameters:
a predetermined relationship between the actual volume flow of the extinguishing fluid and the volume flow detected by the flow-measuring device,
K-factors of the sprinklers in each case, and/or
the extinguishing fluid pressure in the extinguishing fluid line.

12. The fire-extinguishing facility as claimed in claim 1, wherein the evaluation unit is designed to log the course of the approximate detection of the volume flow transported in the extinguishing fluid line over time, and to deposit it in a readable data record.

13. The fire-extinguishing facility as claimed in claim 1, wherein the flow-measuring device has a transmitting and/or receiving device for wireless or wired data transmission and is designed to transmit the values of the approximately detected volume flow to the evaluation unit.

14. A fire-extinguishing system comprising a fire-extinguishing facility as claimed in claim 13; and
    one or more mobile, display units which communicate with the flow-measuring device and/or the evaluation unit and are designed to display the number of open sprinklers associated with the volume flow detected.

15. The fire-extinguishing facility as claimed in claim 1, further comprising at least one display unit which communicates with the evaluation unit and is designed to indicate the number of open sprinklers associated with the detected volume flow.

16. The fire-extinguishing facility as claimed in claim 1, wherein the flow-measuring device is arranged in a bypass line which branches off from the extinguishing fluid line.

17. The fire-extinguishing facility as claimed in claim 16, wherein the bypass line branches off from the extinguishing fluid line at a first branch and opens back into the extinguishing fluid line downstream at a second branch.

18. The fire-extinguishing facility as claimed in claim 16,
    wherein the bypass line branches from the extinguishing fluid line at a common branch and opens back into the extinguishing fluid line, viewed in the flow direction of the extinguishing fluid.

19. The fire-extinguishing facility as claimed in claim 1, wherein the at least one extinguishing fluid line for transporting the extinguishing fluid comprises a main line that divides into a first distributor line and a second distributor line, wherein the plurality of sprinklers comprise a first zone of sprinklers in fluid communication with the first distributor line and a second zone of sprinklers in fluid communication with the second distributor line; and wherein the flow measure device comprises a first flow measuring device associated with first zone of sprinklers and a second flow measuring device associated with the second zone of sprinklers.

20. A method for determining propagation of a fire in a property or area protected by a fire-extinguishing facility, comprising the steps:
    transportation of an extinguishing fluid through a valve station to an extinguishing fluid line in the fire-extinguishing facility to multiple sprinklers connected to the extinguishing fluid line in a fluid-conducting manner, which sprinklers are closed in a standby state and open in an extinguishing state in order to supply the extinguishing fluid,
    approximate detection of a volume flow of the extinguishing fluid transported through the valve station and in the extinguishing fluid line by a flow-measuring device, and
    establishing of an association between the approximately detected volume flow and a number of open sprinklers to determine the propagation of the fire in the facility.

\* \* \* \* \*